(12) United States Patent
Chen et al.

(10) Patent No.: US 12,080,045 B2
(45) Date of Patent: Sep. 3, 2024

(54) OBSTACLE RECOGNITION METHOD AND APPARATUS, COMPUTER DEVICE, AND STORAGE MEDIUM

(71) Applicant: GUANGZHOU WERIDE TECHNOLOGY CO., LTD., Guangdong (CN)

(72) Inventors: Shixi Chen, Guangzhou (CN); Yuchen Zhou, Guangzhou (CN); Hua Zhong, Guangzhou (CN); Xu Han, Guangzhou (CN)

(73) Assignee: GUANGZHOU WERIDE TECHNOLOGY CO., LTD. (CN)

( * ) Notice: Subject to any disclaimer, the term of this patent is extended or adjusted under 35 U.S.C. 154(b) by 400 days.

(21) Appl. No.: 17/601,005

(22) PCT Filed: Apr. 17, 2019

(86) PCT No.: PCT/CN2019/083083
§ 371 (c)(1),
(2) Date: Oct. 1, 2021

(87) PCT Pub. No.: WO2020/206708
PCT Pub. Date: Oct. 15, 2020

(65) Prior Publication Data
US 2022/0198808 A1    Jun. 23, 2022

(30) Foreign Application Priority Data
Apr. 9, 2019    (CN) .......................... 201910278795.5

(51) Int. Cl.
*G01S 17/89*    (2020.01)
*G06T 3/02*    (2024.01)
(Continued)

(52) U.S. Cl.
CPC ............ *G06V 10/454* (2022.01); *G01S 17/89* (2013.01); *G06T 3/02* (2024.01); *G06T 7/74* (2017.01);
(Continued)

(58) Field of Classification Search
None
See application file for complete search history.

(56) References Cited

U.S. PATENT DOCUMENTS

2018/0322640 A1    11/2018    Kim et al.
2018/0365504 A1    12/2018    Xue
(Continued)

FOREIGN PATENT DOCUMENTS

CN    109509210 A    3/2019
CN    109521757 A    3/2019

OTHER PUBLICATIONS

International Search Report dated Jan. 8, 2020 issued in corresponding Parent Application No. PCT/CN2019/083083 with English Translation (6 pages).
(Continued)

*Primary Examiner* — Siamak Harandi
*Assistant Examiner* — Caroline Tabancay Duffy
(74) *Attorney, Agent, or Firm* — Polsinelli PC (57) ABSTRACT

An obstacle recognition method and apparatus, a computer device, and a storage medium are provided. The method comprises: acquiring point cloud data scanned by LiDAR and time-sequence pose information of a vehicle (S101); determining a spliced image of a bird's eye view according to the point cloud data, the time-sequence pose information, and a historical frame embedded image (S102); inputting the spliced image into a preset first CNN model to obtain a current frame embedded image and pixel-level information of the bird's eye view (S103); determining recognition
(Continued)

information of at least one obstacle according to the current frame embedded image and pixel-level information (S104).

10 Claims, 6 Drawing Sheets

(51) Int. Cl.
  *G06T 7/73*  (2017.01)
  *G06T 11/00*  (2006.01)
  *G06V 10/44*  (2022.01)
  *G06V 10/80*  (2022.01)
  *G06V 10/82*  (2022.01)
  *G06V 20/58*  (2022.01)
(52) U.S. Cl.
  CPC ............ *G06T 11/00* (2013.01); *G06V 10/806* (2022.01); *G06V 10/82* (2022.01); *G06V 20/58* (2022.01); *G06T 2207/10028* (2013.01); *G06T 2207/20068* (2013.01); *G06T 2207/20084* (2013.01); *G06T 2207/30261* (2013.01)

(56) References Cited

U.S. PATENT DOCUMENTS

| | | | |
|---|---|---|---|
| 2019/0004533 A1* | 1/2019 | Huang | G06V 10/751 |
| 2019/0086543 A1 | 3/2019 | Wang et al. | |
| 2019/0087666 A1 | 3/2019 | Zhang et al. | |
| 2019/0291723 A1* | 9/2019 | Srivatsa | G06V 10/764 |
| 2020/0025935 A1* | 1/2020 | Liang | G06V 20/64 |
| 2021/0327128 A1* | 10/2021 | Yu | G06T 19/20 |
| 2021/0370968 A1* | 12/2021 | Xiao | G01S 17/931 |

OTHER PUBLICATIONS

Written Opinion dated Jan. 8, 2020 issued in corresponding Parent Application No. PCT/CN2019/083083 (5 pages).

Yu et al., Vehicle Detection and Localization on Bird's Eye View Elevation Images Using Convolutional Neural Network:, IEEE International Symposium on Safety, Security and Rescue Robotics (SSRR) Shanghai, China, Oct. 11-13, 2017, pp. 102-109.

* cited by examiner

OBSTACLE RECOGNITION METHOD AND APPARATUS, COMPUTER DEVICE, AND STORAGE MEDIUM

CROSS-REFERENCE TO RELATED APPLICATION

This application is a national stage for International Application PCT/CN2019/083083, filed on Apr. 17, 2019, which claims priority to Chinese Patent Application No. 201910278795.5, entitled "OBSTACLE RECOGNITION METHOD AND APPARATUS, COMPUTER DEVICE, AND STORAGE MEDIUM" and filed with the Chinese Patent Office on Apr. 9, 2019. The entire contents of both applications are incorporated herein by reference.

TECHNICAL FIELD

The present application relates to the field of autonomous driving, and in particular, to an obstacle recognition method and apparatus, a computer device, and a storage medium.

BACKGROUND

With the development of a Light Detection and Ranging (LiDAR) measurement technology, in applications of driverless vehicles, a method of recognizing an obstacle in a surrounding environment of a vehicle by using a Light Detection and Ranging (LiDAR) scanning technology has been widely used. In the above applications, how to accurately recognize an obstacle has become a focus of attention at present.

Currently, a method of recognizing an obstacle in a surrounding environment by a vehicle mainly includes: firstly, scanning the surrounding environment by using a LiDAR on the vehicle to obtain point cloud data in an environment image, and further inputting the point cloud data into an object recognition model trained in advance to enable the object recognition model to output recognition information of the obstacle, so that the vehicle can recognize the obstacle in the surrounding environment according to the recognition information.

However, the above obstacle recognition method has the problem that the recognition information is single, and thus the recognition accuracy is low.

SUMMARY

In view of the above technical problems, there is a need to provide an obstacle recognition method and apparatus, a computer device, and a storage medium that can recognize a variety of information of an obstacle and have higher recognition accuracy.

In a first aspect, an obstacle recognition method is provided, the method including:
  acquiring point cloud data scanned by a LiDAR and time-sequence pose information of a vehicle;
  determining a spliced image of a bird's eye view according to the point cloud data, the time-sequence pose information, and a historical frame embedded image;
  inputting the spliced image into a preset first CNN model to obtain a current frame embedded image and pixel-level information of the bird's eye view; and
  determining recognition information of at least one obstacle according to the current frame embedded image and the pixel-level information.

In one embodiment, the step of determining a spliced image of a bird's eye view according to the point cloud data, the time-sequence pose information, and a historical frame embedded image includes:
  determining a grid embedded image of the bird's eye view according to the point cloud data;
  determining a conversion image of the historical frame embedded image according to the time-sequence pose information and the historical frame embedded image; and
  splicing the grid embedded image of the bird's eye view and the conversion image of the historical frame embedded image to obtain the spliced image of the bird's eye view.

In one embodiment, the step of determining a grid embedded image of the bird's eye view according to the point cloud data includes:
  acquiring panorama point embedding and each point feature according to the point cloud data;
  inputting the panorama point embedding and each point feature into a preset first FC network model to obtain point embedding of each point; and
  projecting the point embedding of each point into a grid of the bird's eye view to obtain the grid embedded image of the bird's eye view.

In one embodiment, the step of acquiring panorama point embedding and each point feature according to the point cloud data includes:
  extracting a panorama feature and each point feature from the point cloud data; and
  inputting the panorama feature into a preset second CNN model to obtain the panorama point embedding.

In one embodiment, the step of determining a conversion image of the historical frame embedded image according to the time-sequence pose information and the historical frame embedded image includes:
  calculating an affine transformation parameter from a historical frame to a current frame according to the time-sequence pose information; and
  transforming the historical frame embedded image by translation and rotation according to the affine transformation parameter to obtain the conversion image of the historical frame embedded image.

In one embodiment, the step of determining recognition information of at least one obstacle according to the current frame embedded image and the pixel-level information includes:
  determining attribute information of the at least one obstacle according to the pixel-level information, the attribute information including position information and size information of the obstacle;
  determining pixel-level embedding of each obstacle from the current frame embedded image according to the attribute information of each obstacle; and
  inputting the pixel-level embedding of each obstacle into a preset neural network model to obtain a variety of information of each obstacle.

In one embodiment, the neural network model includes a third CNN model and a second FC network model; and the step of inputting the pixel-level embedding of each obstacle into a preset neural network model to obtain a variety of information of each obstacle includes:
  inputting the pixel-level embedding of each obstacle into the third CNN model to obtain object-level embedding of each obstacle; and inputting the object-level embedding into the second FC network model to obtain a variety of information of the at least one obstacle.

In one embodiment, the recognition information includes a confidence level of the obstacle; and the method further includes:

comparing the confidence level of the obstacle with a preset confidence threshold, and filtering out an obstacle whose confidence level is less than the preset confidence threshold.

In a second aspect, an obstacle recognition apparatus is provided, the apparatus including:

an acquisition module configured to acquire point cloud data scanned by a LiDAR and time-sequence pose information of a vehicle;

a determination module configured to determine a spliced image of a bird's eye view according to the point cloud data, the time-sequence pose information, and a historical frame embedded image;

an output module configured to input the spliced image into a preset first CNN model to obtain a current frame embedded image and pixel-level information of the bird's eye view; and a recognition module configured to determine recognition information of at least one obstacle according to the current frame embedded image and the pixel-level information.

In a third aspect, a computer device is provided, including a memory and a processor, the memory storing a computer program, the processor implementing the obstacle recognition method according to any one of the embodiments in the first aspect when executing the computer program.

In a fourth aspect, a computer-readable storage medium is provided, storing a computer program, the obstacle recognition method according to any one of the embodiments in the first aspect being implemented when the computer program is executed by a processor.

In the obstacle recognition method and apparatus, the computer device, and the storage medium according to the present application, firstly, a terminal device acquires point cloud data scanned by a LiDAR and time-sequence pose information of a vehicle; then, a spliced image of a bird's eye view is determined according to the point cloud data, the time-sequence pose information, and historical frame embedded image; next, the spliced image is inputted into a preset first CNN model to obtain a current frame embedded image and pixel-level information of the bird's eye view; finally, recognition information of at least one obstacle is determined according to the current frame embedded image and the pixel-level information. In the process in which the terminal device recognizes the obstacle, the spliced image of the bird's eye view is determined by using the time-sequence pose information of the vehicle and the historical frame embedded image in the surrounding environment, so that the spliced image of the bird's eye view can include a variety of information; therefore, the current frame embedded image obtained by inputting the spliced image of the bird's eye view into the first CNN model includes a variety of information, and then recognition information of the obstacle determined from the current frame embedded image and the pixel-level information of the bird's eye view also includes a variety of information correspondingly. Compared with the conventional obstacle recognition method which can only obtain single recognition information (such as one information of classification, geometric shape and height), the information of the obstacle recognized with the obstacle recognition method according to the present application can simultaneously include a variety of information such as a category, a geometric shape, a height, a position, a speed and a confidence level of the obstacle. Therefore, the obstacle recognition method according to the present application has the capability to recognize a variety of information of the obstacle, and has higher recognition accuracy.

DETAILED DESCRIPTION OF THE EMBODIMENTS

In order to make the objectives, technical solutions and advantages of the present application clearer, the present application is described in further detail below with reference to the accompanying drawings and embodiments. It should be understood that specific embodiments described herein are intended only to interpret the present application and not intended to limit the present application.

Figure 1:
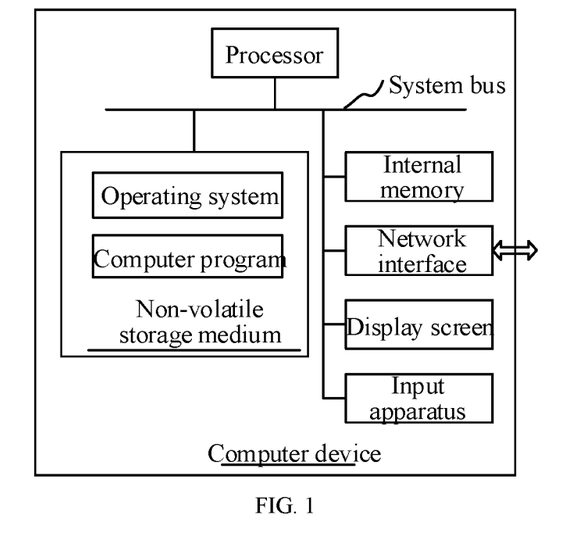
FIG. 1 is a schematic diagram of an internal structure of a computer device according to an embodiment.

The obstacle recognition method according to the present application is applicable to a computer device as shown in FIG. 1. The computer device may be a terminal, and a diagram of an internal structure thereof is shown in FIG. 1. The computer device includes a processor, a memory, a network interface, a display screen, and an input apparatus that are connected by a system bus. The processor of the computer device is configured to provide computing and control capabilities. The memory of the computer device includes a non-transitory storage medium and an internal memory. The non-transitory storage medium stores an operating system and a computer program. The internal memory provides an environment for running of the operating system and the computer program in the non-transitory storage medium. The network interface of the computer device is configured to communicate with an external terminal through a network connection. The computer program is executed by the processor to implement an obstacle recognition method. The display screen of the computer device may be a liquid crystal display screen or an electronic ink display screen. The input apparatus of the computer device may be a touch layer covering the display screen, or may be a key, a trackball, or a touchpad disposed on a housing of the computer device, or may be an external keyboard, a touchpad, a mouse, or the like.

Those skilled in the art may understand that, the structure shown in FIG. 1 is only a block diagram of a partial structure related to the solution in the present application, which does not constitute a limitation to the computer device that the solution in the present application is applied to. Specifically, the computer device may include more or fewer components than those shown in the drawings, or some components may be combined, or a different component deployment may be used.

The technical solutions of the present application and how the technical solutions of the present application solve the above technical problems are described in detail below through embodiments with reference to the accompanying drawings. The following specific embodiments may be combined with each other, and a same or similar concept or process may not be described repeatedly in some embodiments.

Figure 2:
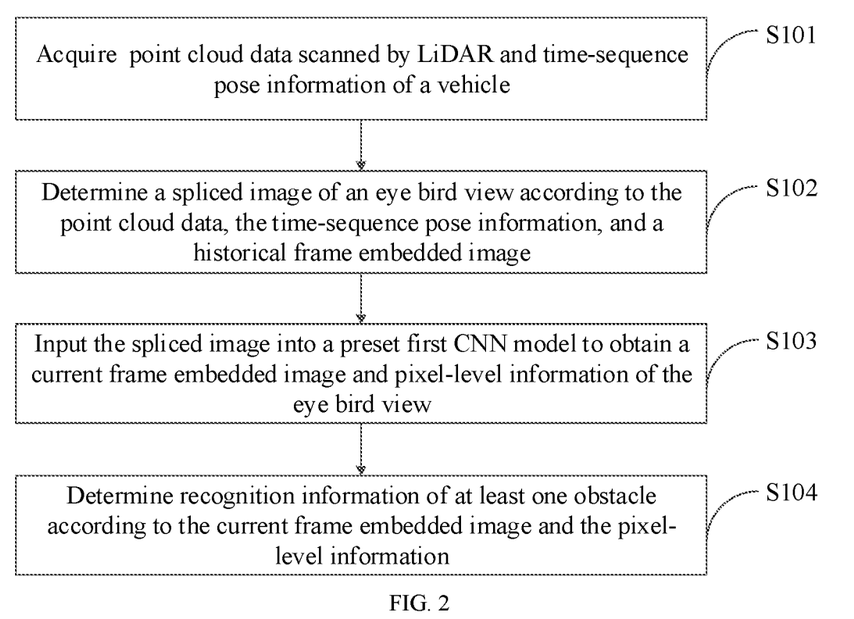
FIG. 2 is a flowchart of an obstacle recognition method according to an embodiment.

FIG. 2 is a flowchart of an obstacle recognition method according to an embodiment. In this embodiment, the method is executed by a terminal device. This embodiment relates to a specific process in which the terminal device recognizes an obstacle in a surrounding environmental according to point cloud data scanned by a LiDAR. As shown in FIG. 2, the method includes the following steps.

In S101, point cloud data scanned by a LiDAR and time-sequence pose information of a vehicle are acquired.

The point cloud data refers to a set of vectors in a three-dimensional coordinate system. These vectors are generally expressed in a form of (x, y, z) three-dimensional coordinates and are mainly configured to represent an external surface shape of an obstacle. The time-sequence pose information of the vehicle refers to pose change information of the vehicle at previous and subsequent moments, and the pose change information may include position change information, direction change information, speed change information, and the like of the vehicle.

In practical applications, the terminal device may be a terminal device mounted on the vehicle or a terminal device connected to the vehicle. The vehicle may be provided with a LiDAR scanning device configured to enable 360° scanning of an environment around the vehicle, so as to obtain the point cloud data scanned by the LiDAR. A navigation device or a detection device configured to detect the time-sequence pose information of the vehicle in real time may also be mounted on the vehicle. In this embodiment, the terminal device may be connected to the LiDAR scanning device. When the terminal device recognizes an obstacle in a surrounding environment, the terminal device may first obtain point cloud data corresponding to the surrounding environment through the LiDAR scanning device on the vehicle. Optionally, the terminal device may also acquire the point cloud data corresponding to the surrounding environment through other devices. The terminal device may also be connected to the navigation device or detection device. When the terminal device is to recognize the obstacle in the surrounding environment, the terminal device may obtain the time-sequence pose information of the vehicle through the navigation device or detection device on the vehicle. Optionally, the terminal device may also acquire the time-sequence pose information of the vehicle through other devices.

In S102, a spliced image of a bird's eye view is determined according to the point cloud data, the time-sequence pose information, and a historical frame embedded image.

The historical frame embedded image is used for representing point cloud embedded images in the surrounding environment at historical moments. The spliced image of the bird's eye view is obtained by splicing a grid embedded image of the bird's eye view with an image formed after coordinate transformation of the historical frame embedded image.

In this embodiment, when the terminal device acquires the point cloud data of the surrounding environment and the time-sequence pose information of the vehicle, firstly, historical frame embedded image may be acquired according to a current frame embedded image by using a corresponding image conversion method, a grid embedded image of the bird's eye view is obtained from the point cloud data, and then an image formed after coordinate transformation of the historical frame embedded image is acquired from the historical frame embedded image and the time-sequence pose information of the vehicle, and then the image formed after coordinate transformation of the historical frame embedded image may be spliced with the grid embedded image of the bird's eye view to generate the spliced image of the bird's eye view.

In S103, the spliced image is inputted into a preset first CNN (Convolutional Neural Network) model to obtain a current frame embedded image and pixel-level information of the bird's eye view.

The first CNN model is a convolutional neural network model, which may be constructed by the terminal device in advance by using a corresponding convolutional neural network algorithm. In this embodiment, the first CNN model is used for obtaining a current frame embedded image and pixel-level information of a bird's eye view according to the spliced image of the bird's eye view. The current frame embedded image is used for representing a point cloud embedded image in the surrounding environment at a current moment. The pixel-level information of the bird's eye view includes information such as classification, clustering, confidence level, speed and the like in the bird's eye view at the pixel level.

In this embodiment, when the terminal device acquires the spliced image of the bird's eye view, the spliced image of the bird's eye view may be further inputted to the first CNN model constructed in advance for recognition so as to enable the first CNN model to output the current frame embedded image and the pixel-level information of the bird's eye view.

In S104, recognition information of at least one obstacle is determined according to the current frame embedded image and the pixel-level information.

The recognition information of the obstacle may include information such as category, two-dimensional or three-dimensional bounding box, geometric shape, speed, confidence level and the like of the obstacle. In this embodiment, when the terminal device acquires the current frame embedded image in the surrounding environment and the pixel-level information, embedding of at least one obstacle in the surrounding environment may be further determined according to the current frame embedded image and the pixel-level information by using an image conversion method, and then recognition information of the obstacle is determined according to an embedded image of the at least one obstacle. The recognition information may specifically include a variety of information for describing the obstacle, such as category, two-dimensional or three-dimensional bounding box, geometric shape, height, position, confidence level and the like. It is to be noted that the embedding of the at least one obstacle may include pixel-level embedding of the obstacle and object-level embedding of the obstacle.

In the obstacle recognition method according to the above embodiment, firstly, a terminal device acquires point cloud data scanned by a LiDAR and time-sequence pose information of a vehicle; then, a spliced image of a bird's eye view is determined according to the point cloud data, the time-sequence pose information, and historical frame embedded image; next, the spliced image is inputted into a preset first CNN model to obtain a current frame embedded image and pixel-level information of the bird's eye view; finally, recognition information of at least one obstacle is determined according to the current frame embedded image and the pixel-level information. In the process in which the terminal device recognizes the obstacle, the spliced image of the bird's eye view is determined by using the time-sequence pose information of the vehicle and the historical frame embedded image in the surrounding environment, so that the spliced image of the bird's eye view can include a variety of information; therefore, the current frame embedded image obtained by inputting the spliced image of the bird's eye view into the first CNN model includes a variety of information, and then recognition information of the obstacle determined from the current frame embedded image and the pixel-level information of the bird's eye view also includes a variety of information correspondingly. Compared with the conventional obstacle recognition method which can only obtain single recognition information (such as one information of classification, geometric shape and height), the information of the obstacle recognized with the obstacle recognition method according to the present application can simultaneously include a variety of information such as a category, a geometric shape, a height, a position, a speed and a confidence level of the obstacle.

Therefore, the obstacle recognition method according to the present application has the capability to recognize a variety of information of the obstacle, and has higher recognition accuracy.

Figure 3:
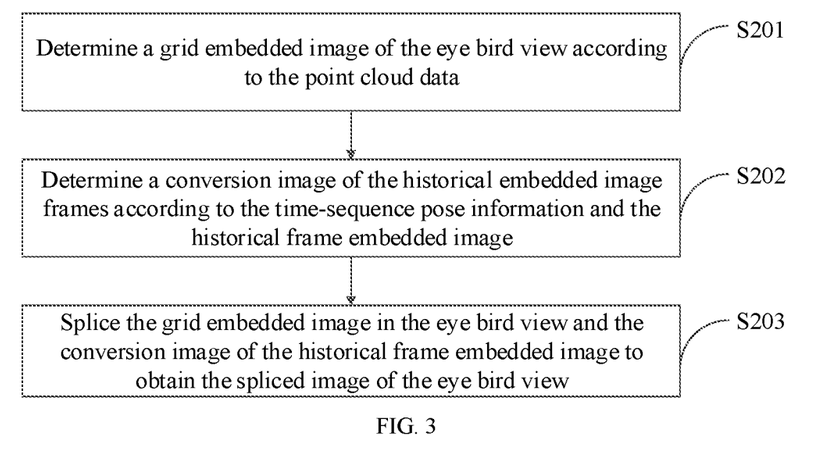
FIG. 3 is a flowchart of an implementation of S102 according to the embodiment of FIG. 2.

In one embodiment, FIG. 3 is a flowchart of an implementation of S102 according to the embodiment of FIG. 2. This embodiment relates to a specific process in which the terminal device determines the spliced image of the bird's eye view. As shown in FIG. 3, S102 "determining a spliced image of a bird's eye view according to the point cloud data, the time-sequence pose information, and historical frame embedded image" includes the following steps.

In S201, a grid embedded image of the bird's eye view is determined according to the point cloud data.

The grid embedded image of the bird's eye view is used for representing an image generated by projecting embedding of each point in the point cloud data onto a grid image of the bird's eye view. In this embodiment, when the terminal device acquires the point cloud data scanned by the LiDAR, embedding of each point may be further obtained according to the point cloud data, and then the embedding of each point is projected onto the preset grid image of the bird's eye view for transformation, so as to obtain a grid embedded image of the bird's eye view for later use.

In S202, a conversion image of the historical frame embedded image is determined according to the time-sequence pose information and the historical frame embedded image.

In this embodiment, when the terminal device acquires the time-sequence pose information of the vehicle and the historical frame embedded image, corresponding image conversion may be further performed on the historical frame embedded image according to the time-sequence pose information by using a corresponding image conversion method, for example, a coordinate conversion method, to obtain the conversion image of the historical frame embedded image.

In S203, the spliced image of the bird's eye view is obtained by splicing the grid embedded image of the bird's eye view with the conversion image of the historical frame embedded image.

In this embodiment, when the terminal device acquires the grid embedded image of the bird's eye view and the conversion image of the historical frame embedded image, the grid embedded image of the bird's eye view may be spliced with the conversion image of the historical frame embedded image by using a corresponding splicing method to obtain the spliced image of the bird's eye view.

Figure 4:
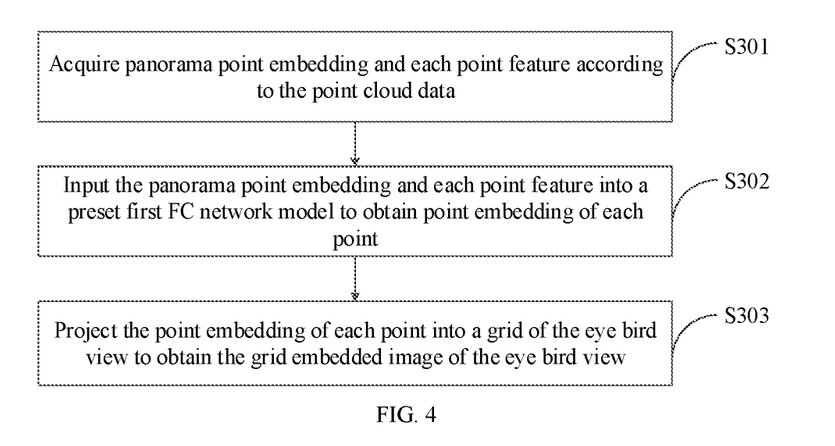
FIG. 4 is a flowchart of an implementation of S201 according to the embodiment of FIG. 3.

In one embodiment, FIG. 4 is a flowchart of an implementation of S201 according to the embodiment of FIG. 3. This embodiment relates to a specific process in which the terminal device determines the grid embedded image of the bird's eye view. As shown in FIG. 4, S201 "determining a spliced image of an bird's eye view according to the point cloud data" includes the following steps.

In S301, panorama point embedding and each point feature are acquired according to the point cloud data.

The panorama point embedding is used for representing point embedding in a panorama generated after transformation of a panorama feature corresponding to the point cloud data scanned by the LiDAR.

In this embodiment, when the terminal device acquires the point cloud data scanned by the LiDAR, the panorama feature and each point feature may be extracted directly from the point cloud data by using a corresponding extraction method, and then the panorama feature is further converted into panorama point embedding by using a corresponding image conversion method, so as to facilitate later use.

In S302, the panorama point embedding and each point feature are inputted into a preset first FC network model to obtain point embedding of each point.

The first FC network model is a fully connected network model, which may be constructed in advance by the terminal device by using a corresponding calculation method. In this embodiment, the first FC network model is configured to obtain the point embedding of each point according to the panorama point embedding and each point feature. In this embodiment, after the terminal device obtains the panorama point embedding and each point feature, the panorama point embedding and each point feature may be inputted into the preset first FC network model to enable the first FC network model to output the point embedding of each point for later use.

In S303, the point embedding of each point is projected into a grid of the bird's eye view to obtain the grid embedded image of the bird's eye view.

The grid bird's eye view may be a h*w two-dimensional grid, and specific values of h and w may be determined according to actual recognition accuracy. The grid of the bird's eye view may be obtained by the terminal device by gridding the bird's eye view in advance.

In this embodiment, when the terminal device acquires the point embedding of each point and the pre-allocated grid of the bird's eye view, the point embedding of each point may be projected into the grid of the bird's eye view to convert the grid image of the bird's eye view into the grid embedded image of the bird's eye view, so as to obtain the grid embedded image of the bird's eye view.

Figure 5:
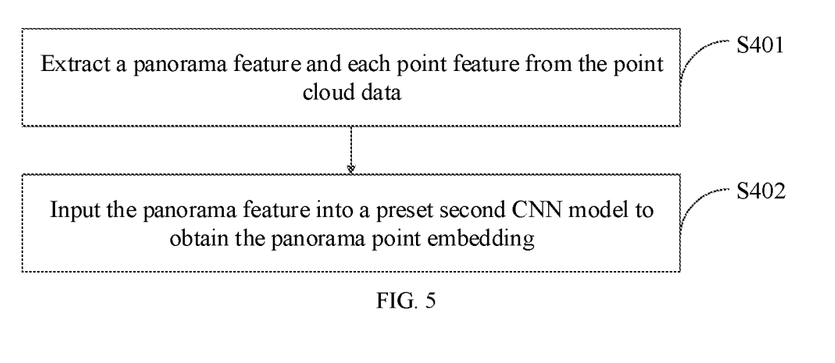
FIG. 5 is a flowchart of an implementation of S301 according to the embodiment of FIG. 4.

In one embodiment, FIG. 5 is a flowchart of an implementation of S301 according to the embodiment of FIG. 4. This embodiment relates to a specific process in which the terminal device obtains panorama point embedding and each point feature. As shown in FIG. 5, S301 "acquiring panorama point embedding and each point feature according to the point cloud data" includes the following steps.

In S401, a panorama image and each point feature are extracted from the point cloud data.

The panorama feature may be obtained according to the following method: dividing a point cloud image corresponding to a visual region and scanned by a LiDAR into a region image with a vertical viewing angle and a region image with a horizontal circular angle, and then dividing the region image with the vertical viewing angle and the region image with the horizontal circular angle into h'*w' two-dimensional grids. Values of h' and w' may be adjusted according to an actual recognition accuracy requirement. If there is a point cloud located in each grid, coordinates, intensity and other features of the point cloud are calculated, and calculation results are taken as feature values of the grid. If no point cloud is located in each grid, the value 0 is taken as a feature value of the grid. After the above process, the feature values of all the grids finally obtained are referred to as the panorama feature.

In this embodiment, when the terminal device acquires the point cloud data scanned by the LiDAR, the point cloud data may be further converted into point cloud images from various perspectives, the panorama feature is obtained by using the above method for acquiring the panorama feature, and each point feature is extracted from the point cloud data by using the corresponding extraction method. Each point feature may specifically include information such as coordinate, intensity, distance and the like of each point.

In S402, the panorama feature is inputted into a preset second CNN model to obtain the panorama point embedding.

The second CNN model is a convolutional neural network model. Optionally, the second CNN model may be a multi-layer convolutional neural network model, which may be constructed in advance by the terminal device by using a corresponding convolutional neural network algorithm. In this embodiment, the second CNN model is configured to convert the panorama feature to obtain the panorama point embedding.

In this embodiment, after the terminal device extracts the panorama feature from the point cloud data, the panorama feature may be further inputted into the second CNN model to enable the second CNN model to convert the panorama feature, and corresponding panorama point embedding is finally outputted for later use.

Figure 6:
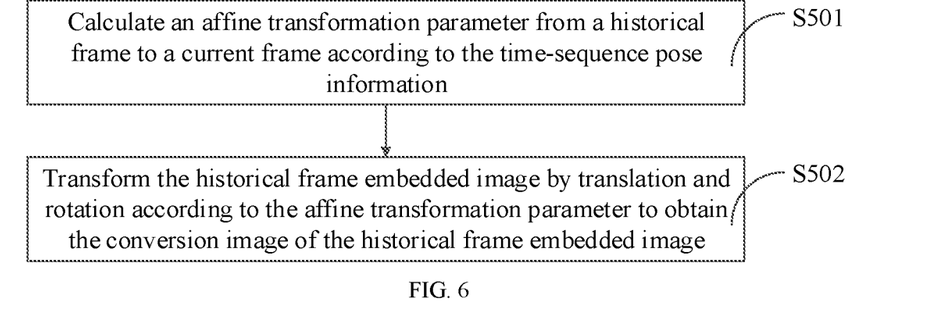
FIG. 6 is a flowchart of an implementation of S202 according to the embodiment of FIG. 3.

In one embodiment, FIG. 6 is a flowchart of an implementation of S202 according to the embodiment of FIG. 3. This embodiment relates to a specific process in which the terminal device determines a conversion image of the historical frame embedded image. As shown in FIG. 6, S202 "determining a conversion image of the historical frame embedded image according to the time-sequence pose information and the historical frame embedded image" includes the following steps.

In S501, an affine transformation parameter from historical frames to a current frame is calculated according to the time-sequence pose information.

The affine transformation parameter from the historical frames to the current frame is a conversion parameter used by the terminal device to convert the historical frame embedded image. In this embodiment, when the terminal device acquires the time-sequence pose information of the vehicle, that is, pose change information of the vehicle between the historical frames and the current frame is obtained, the affine transformation parameter from the historical frames to the current frame can be calculated by analyzing the pose change information.

In S502, the historical frame embedded image is transformed by translation and rotation according to the affine transformation parameter to obtain the conversion image of the historical frame embedded image.

In this embodiment, when the terminal device acquires the affine transformation parameter from the historical frames to the current frame, the historical frame embedded image may be transformed by translation and rotation correspondingly with reference to the affine transformation parameter, so as to obtain the conversion image of the transformed historical frame embedded image.

Figure 7:
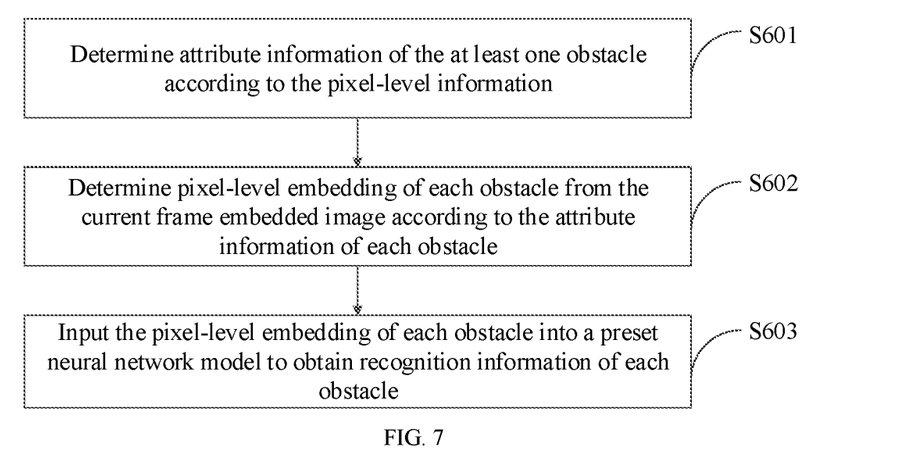
FIG. 7 is a flowchart of an implementation of S104 according to the embodiment of FIG. 2.

In one embodiment, FIG. 7 is a flowchart of an implementation of S104 according to the embodiment of FIG. 2. This embodiment relates to a specific process in which the terminal device determines recognition information of an obstacle. As shown in FIG. 7, S104 "determining recognition information of at least one obstacle according to the current frame embedded image and the pixel-level information" includes the following steps.

In S601, attribute information of the at least one obstacle is determined according to the pixel-level information.

The attribute information includes position information and size information of the obstacle. In this embodiment, the terminal device may determine attribute information of the at least one obstacle in the current frame embedded image according to clustering information in the pixel-level information. For example, the terminal device may determine a specific position and a geometric shape of each obstacle in the current frame embedded image according to clustering information outputted by the second CNN model.

In S602, pixel-level embedding of each obstacle is determined from the current frame embedded image according to the attribute information of the obstacle.

In this embodiment, when the terminal device acquires attribute information of each obstacle, that is, determines a position and a size of each obstacle in the current frame embedded image, the terminal device may further crop from the current frame embedded image to obtain pixel-level embedding of each obstacle according to the position and the size of each obstacle in the current frame embedded image.

In S603, the pixel-level embedding of each obstacle is inputted into a preset neural network model to obtain recognition information of each obstacle.

The neural network model may include a plurality of neural network models, which may specifically be a CNN model or an FC network model. In this embodiment, the neural network model is configured to obtain recognition information corresponding to each obstacle according to the pixel-level embedding of each obstacle. The recognition information may specifically include a variety of information describing the obstacle, for example, category, height, geometric shape, speed, confidence and other information of the obstacle.

In this embodiment, when the terminal device acquires the pixel-level embedding of each obstacle according to the method in the above embodiment, the pixel-level embedding of each obstacle may be further inputted to the preset neural network model, and the pixel-level embedding of each obstacle is recognized, so that the preset neural network model outputs recognition information describing each obstacle.

Figure 8:
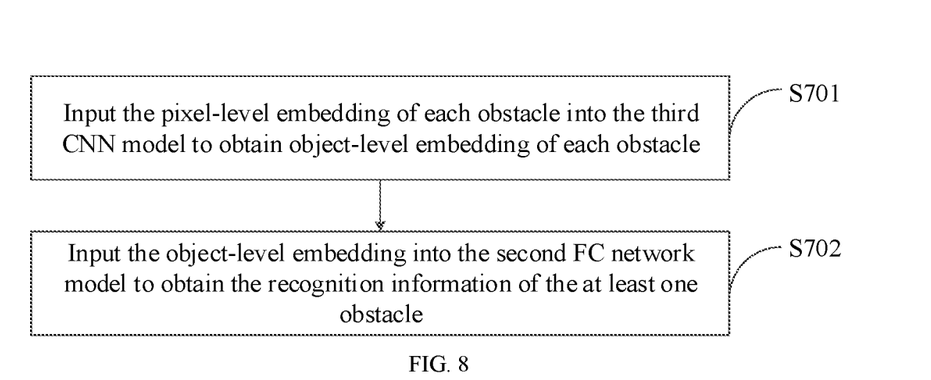
FIG. 8 is a flowchart of an implementation of S603 according to the embodiment of FIG. 7.

In one embodiment, the present application provides specific model types included in the neural network model; that is, the neural network model includes a third CNN model and a second FC network model. FIG. 8 is a flowchart of an implementation of S603 according to the embodiment of FIG. 7. As shown in FIG. 8, S603 "inputting the pixel-level embedding of each obstacle into a preset neural network model to obtain recognition information of each obstacle" includes the following steps.

In S701, the pixel-level embedding of each obstacle is inputted into the third CNN model to obtain object-level embedding of the obstacle.

The third CNN model is a convolutional neural network model, which may be constructed in advance by the terminal device by using a corresponding convolutional neural network algorithm. In this embodiment, the third CNN model is configured to perform image conversion between a pixel level and an object level on the pixel-level embedding of each obstacle, so as to obtain object-level embedding of each obstacle. Optionally, the third CNN model in this embodiment may be a pyramid CNN model.

In this embodiment, when the terminal device acquires the pixel-level embedding of each obstacle, the pixel-level embedding of each obstacle may be further inputted to the third CNN model constructed in advance to enable the third CNN model to output object-level embedding of each obstacle.

In S702, the object-level embedding is inputted into the second FC network model to obtain the recognition information of the at least one obstacle.

The second FC network model is a fully connected network model, which may be constructed in advance by the terminal device by using a corresponding calculation method. In this embodiment, the second FC network model is configured to recognize the object-level embedding of each obstacle to obtain recognition information of each obstacle.

In this embodiment, when the terminal devices obtain the object-level embedding of each obstacle, the object-level embedding of each obstacle may be further inputted to the second FC network model constructed in advance to enable the second FC network model to output recognition information of each obstacle, so as to recognize each obstacle. The recognition information in this embodiment may include category, geometric shape, height, speed, confidence and other information that can represent each obstacle.

In one embodiment, when the recognition information includes the confidence level of the obstacle, the obstacle recognition method according to the present application further includes: comparing the confidence degree of the obstacle with a preset confidence threshold, and filtering out the obstacle whose confidence degree is less than the preset confidence threshold.

The preset confidence threshold may be determined in advance by the terminal device according to actual recognition accuracy. The higher the preset confidence threshold, the higher the recognition accuracy of obstacle recognition performed by the terminal device.

This embodiment relates to a process in which the terminal device further optimizing and screening the recognition information of each obstacle. The process specifically includes: firstly, acquiring, by the terminal device, a confidence level of each obstacle from the recognition information of each obstacle, and then comparing the confidence level of each obstacle with a preset confidence threshold, and filtering out the obstacles corresponding to the confidence degrees less than the preset confidence threshold, so as to select an obstacle meeting an actual recognition accuracy requirement from the at least one obstacle.

Based on the obstacle recognition methods according to all the above embodiments, the present application further provides an obstacle recognition network structure. Referring to a schematic diagram of an obstacle recognition network structure shown in FIG. 9, the structure mainly includes: a first CNN model, a second CNN model, a third CNN model, a first FC network model, a second FC network model and an RNN (Recurrent Neural Network) model.

Figure 9:
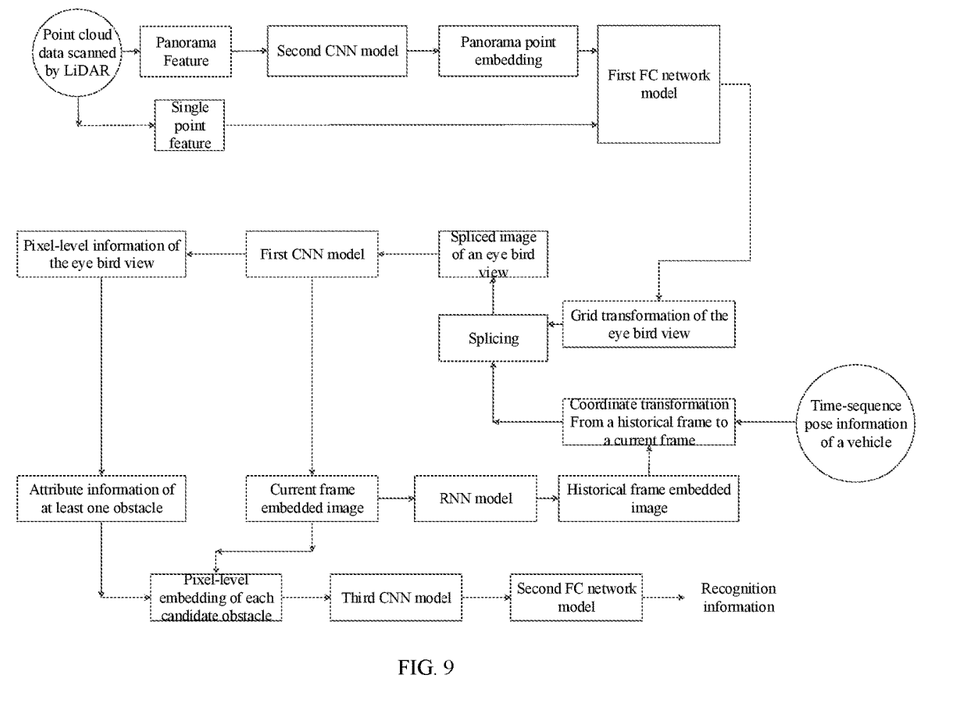
FIG. 9 is a schematic diagram of an obstacle recognition network structure according to an embodiment.

The first CNN model is configured to output pixel-level information of a current frame embedded image and a bird's eye view according to an inputted spliced image of the bird's eye view. The second CNN model is configured to output panorama point embedding according to an inputted panorama feature. The third CNN model is configured to output object-level embedding of each obstacle according to inputted pixel-level embedding of each obstacle. The first FC network model is configured to output point embedding of each point according to an inputted panorama point feature and a single-point feature. The second FC network model is configured to output recognition information of each obstacle according to the inputted object-level embedding of each obstacle. The RNN model is configured to output historical frame embedded image according to the inputted current frame embedded image.

A specific implementation process for recognition of each obstacle in a surrounding environment by using the above recognition network structure is as follows. On the one hand, LiDAR 360° scans the surrounding environment to obtain scanned point cloud data; a terminal device is connected to the LiDAR to obtain the scanned point cloud data, extracts a panorama point feature and a single-point feature from the scanned point cloud data by using a corresponding feature extraction method, and inputs the panorama point feature into a preset second CNN model for transformation to obtain panorama point embedding; then, the terminal device simultaneously input the panorama point feature and the single-point feature into a preset first FC network model for full connection to obtain point embedding of each point, and further projects the point embedding of each point into a pre-allocated grid of the bird's eye view to perform grid transformation of the bird's eye view to obtain a grid embedded image of the bird's eye view after transformation. On the other hand, the terminal device acquires time-sequence pose information of a vehicle according to a detection system or navigation system on the vehicle, and then calculates an affine transformation parameter from historical frames to a current frame according to the time-sequence pose information; when the terminal device obtains historical frame embedded image, the historical frame embedded image may be transformed by translation and rotation correspondingly with reference to the affine transformation parameter, so as to obtain an image after transformation; after the terminal device obtains the image after transformation and the grid embedded image of the bird's eye view, the images may be spliced to obtain a spliced image of the bird's eye view, and then the spliced image of the bird's eye view is inputted into a preset first CNN model for recognition to obtain pixel-level information of the bird's eye view and a current frame embedded image. The terminal device may input the current frame embedded image into an RNN model to obtain historical frame embedded image for later use when a next frame embedded image is acquired. When the terminal device obtains the pixel-level information of the bird's eye view, attribute information of at least one obstacle may be further determined according to clustering information in the pixel-level information to indicate a specific position and size of each obstacle in the current frame embedded image; then, the terminal device may crop the current frame embedded image to obtain pixel-level embedding of each obstacle; finally, the terminal device inputs the pixel-level embedding of each obstacle into a preset third CNN model for transformation to obtain object-level embedding of the obstacle, further inputs the object-level embedding of each obstacle into a preset second FC network model for information recognition of the obstacle, and finally obtains recognition information of each obstacle at an output end of the second FC network model.

In the above embodiment, in the process in which the terminal device recognizes each obstacle in the surrounding environment, a plurality of recognition models such as a first CNN model and an RNN model are used to cooperatively recognize the obstacle, and each recognition model may output different recognition information according to different input information; therefore, the information of the obstacle recognized with the obstacle recognition method according to the present application may include a variety of different attribute information and is diversified, so that the obstacle recognition accuracy is higher.

It should be understood that, although the steps in the flowcharts of FIG. 2 to FIG. 9 are displayed in sequence as indicated by the arrows, the steps are not necessarily performed in the order indicated by the arrows. Unless otherwise clearly specified herein, the steps are performed without any strict sequence limitation, and may be performed in other orders. In addition, at least some steps in FIG. 2 to FIG. 9 may include a plurality of sub-steps or a plurality of stages, and these sub-steps or stages are not necessarily performed at a same moment, and may be performed at different moments. The sub-steps or stages are not necessarily performed in sequence.

Figure 10:
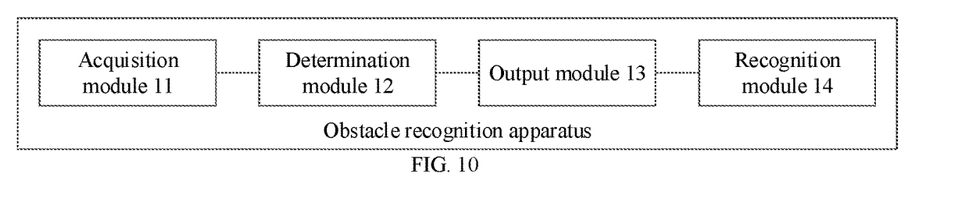
FIG. 10 is a schematic structural diagram of an obstacle recognition apparatus according to an embodiment.

In one embodiment, as shown in FIG. 10, an obstacle recognition apparatus is provided, including: an acquisition module 11, a determination module 12, an output module 13 and a recognition module 14.

The acquisition module 11 is configured to obtain point cloud data scanned by a LiDAR and time-sequence pose information of a vehicle.

The determination module 12 is configured to determine a spliced image of a bird's eye view according to the point cloud data, the time-sequence pose information, and a historical frame embedded image.

The output module 13 is configured to input the spliced image into a preset first CNN model to obtain a current frame embedded image and pixel-level information of the bird's eye view.

The recognition module 14 is configured to determine recognition information of at least one obstacle according to the current frame embedded image and the pixel-level information.

Figure 11:
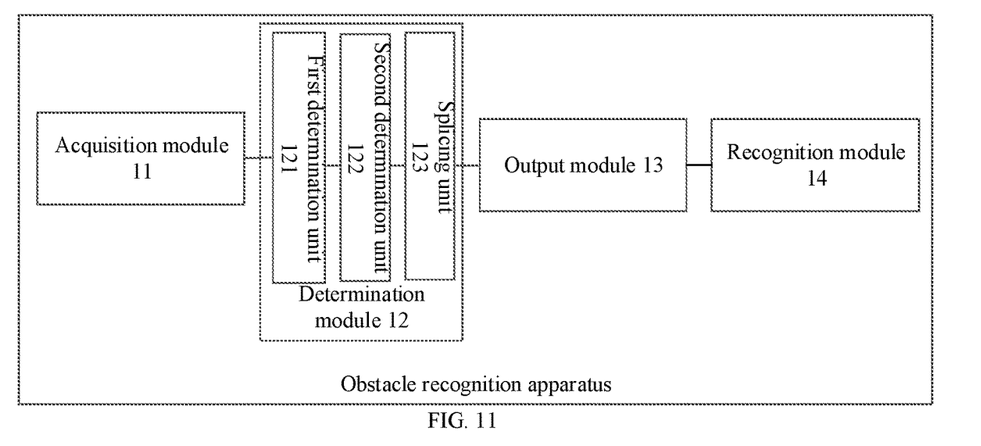
FIG. 11 is a schematic structural diagram of an obstacle recognition apparatus according to an embodiment.

In one embodiment, as shown in FIG. 11, the determination module 12 includes: a first determination unit 121, a second determination unit 122 and a splicing unit 123.

The first determination unit 121 is configured to determine a grid embedded image of the bird's eye view according to the point cloud data.

The second determination unit 122 is configured to determine a conversion image of the historical frame embedded image according to the time-sequence pose information and the historical frame embedded image.

The splicing unit 123 is configured to splice the grid embedded image of the bird's eye view and the conversion image of the historical frame embedded image to obtain the spliced image of the bird's eye view.

Figure 12:
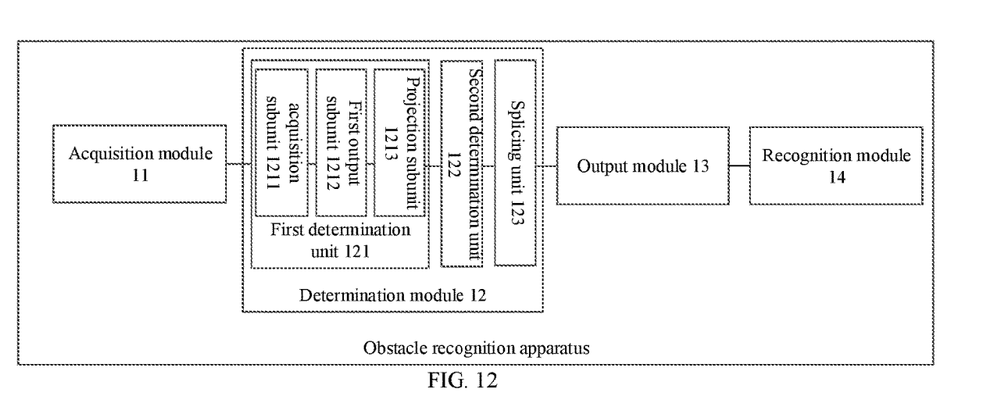
FIG. 12 is a schematic structural diagram of an obstacle recognition apparatus according to an embodiment.

In one embodiment, as shown in FIG. 12, the first determination unit 121 includes: an acquisition subunit 1211, a first output subunit 1212 and a projection subunit 1213.

The acquisition subunit 1211 is configured to obtain panorama point embedding and each point feature according to the point cloud data.

The first output subunit 1212 is configured to input the panorama point embedding and each point feature into a preset first FC network model to obtain point embedding of each point.

The projection subunit 1213 is configured to project the point embedding of each point into a grid of the bird's eye view to obtain the grid embedded image of the bird's eye view.

In one embodiment, the acquisition subunit 1211 is specifically configured to extract a panorama feature and each point feature from the point cloud data; and
 input the panorama feature into a preset second CNN model to obtain the panorama point embedding.

Figure 13:
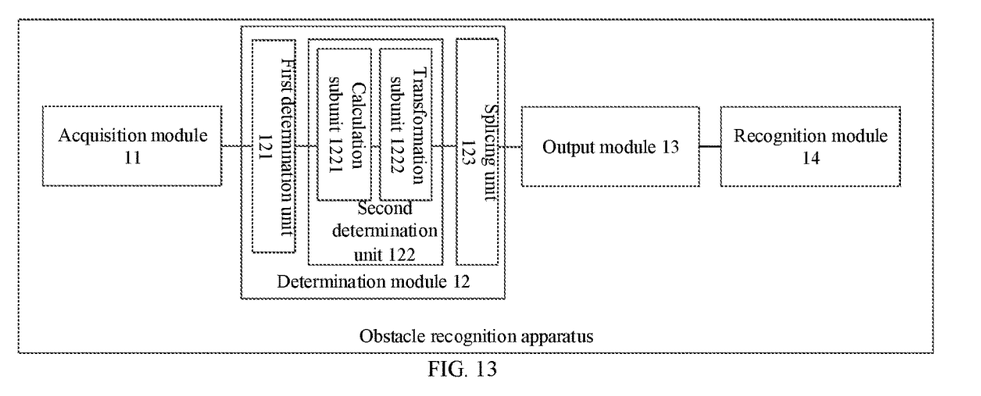
FIG. 13 is a schematic structural diagram of an obstacle recognition apparatus according to an embodiment.

In one embodiment, as shown in FIG. 13, the second determination unit 122 includes: a calculation subunit 1221 and a transformation subunit 1222.

The calculation subunit 1221 is configured to calculate an affine transformation parameter from a historical frame to a current frame according to the time-sequence pose information.

The transformation subunit 1222 is configured to transform the historical frame embedded image by translation and rotation according to the affine transformation parameter to obtain the conversion image of the historical frame embedded image.

Figure 14:
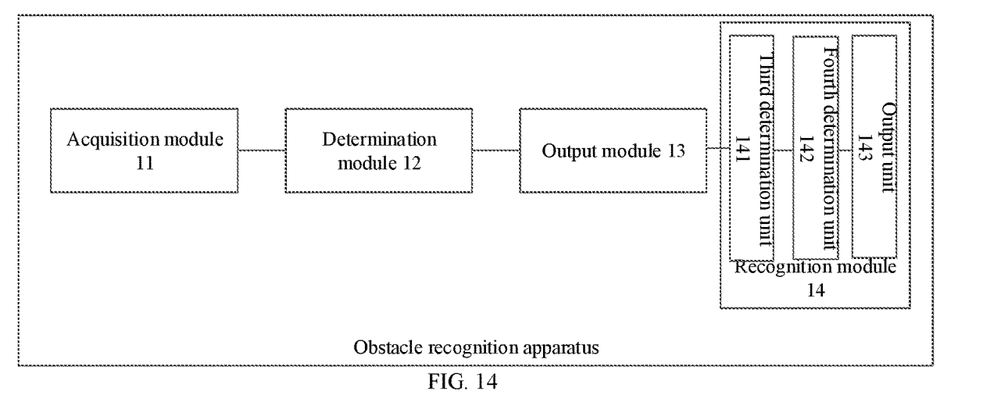
FIG. 14 is a schematic structural diagram of an obstacle recognition apparatus according to an embodiment.

In one embodiment, as shown in FIG. 14, the recognition module 14 includes: a third determination unit 141, a fourth determination unit 142 and an output unit 143.

The third determination unit 141 is configured to determine attribute information of the at least one obstacle according to the pixel-level information; the attribute information includes position information and size information of the obstacle.

The fourth determination unit 142 is configured to determine pixel-level embedding of each obstacle from the current frame embedded image according to the attribute information of the obstacle.

The output unit 143 is configured to input the pixel-level embedding of each obstacle into a preset neural network model to obtain a variety of information of each obstacle.

Figure 15:
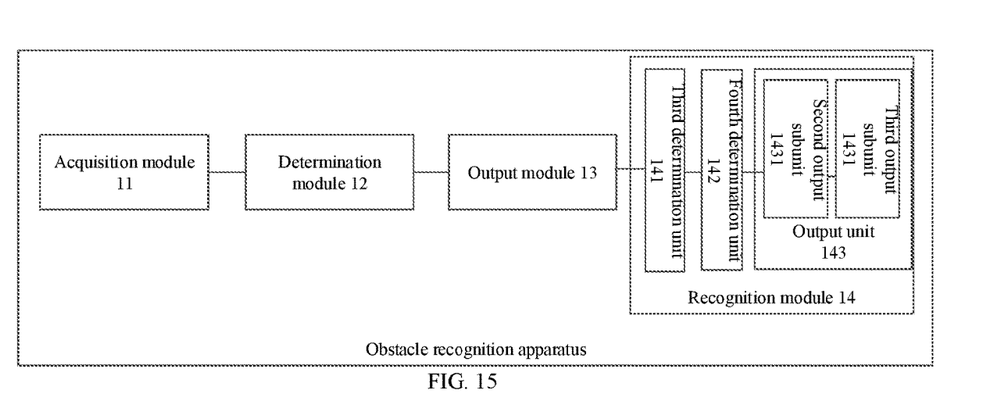
FIG. 15 is a schematic structural diagram of an obstacle recognition apparatus according to an embodiment.

In one embodiment, as shown in FIG. 15, the output unit 143 includes: a second output subunit 1431 and a third output subunit 1432.

The second output subunit 1431 is configured to input the pixel-level embedding of each obstacle into the third CNN model to obtain object-level embedding of the obstacle.

The third output subunit 1432 is configured to input the object-level embedding into the second FC network model to obtain a variety of information of the at least one obstacle.

Figure 16:
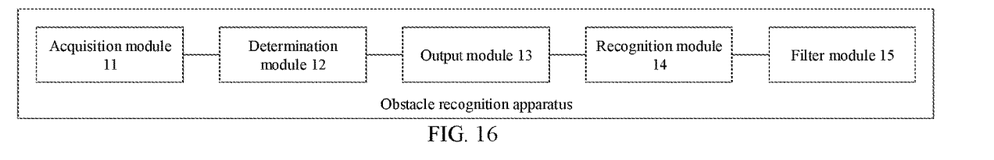
FIG. 16 is a schematic structural diagram of an obstacle recognition apparatus according to an embodiment.

In one embodiment, as shown in FIG. 16, the obstacle recognition apparatus further includes:

a filter module 15 configured to compare the confidence level of the obstacle with a preset confidence threshold, and filter out the obstacle whose confidence level is less than the preset confidence threshold.

A specific limitation on the obstacle recognition apparatus may be obtained with reference to the limitation on the obstacle recognition method above. Details are not described herein again. The modules in the above obstacle recognition apparatus may be implemented entirely or partially by software, hardware, or a combination thereof. The above modules may be built in or independent of a processor of a computer device in a hardware form, or may be stored in a memory of the computer device in a software form, so that the processor invokes and performs operations corresponding to the above modules.

In one embodiment, a computer device is provided, including a memory and a processor, the memory storing a computer program, and the processor, when executing the computer program, implementing the following steps:

acquiring point cloud data scanned by a LiDAR and time-sequence pose information of a vehicle;

determining a spliced image of a bird's eye view according to the point cloud data, the time-sequence pose information, and a historical frame embedded image;

inputting the spliced image into a preset first CNN model to obtain a current frame embedded image and pixel-level information of the bird's eye view; and determining recognition information of at least one obstacle according to the current frame embedded image and the pixel-level information.

The implementation principle and technical effect of the computer device according to the above embodiment are similar to those in the above method embodiment, which are not described in detail herein.

In one embodiment, a computer-readable storage medium is provided, storing a computer program, when the computer program is executed by a processor, the following steps being implemented:

acquiring point cloud data scanned by a LiDAR and time-sequence pose information of a vehicle;

determining a spliced image of a bird's eye view according to the point cloud data, the time-sequence pose information, and a historical frame embedded image;

inputting the spliced image into a preset first CNN model to obtain a current frame embedded image and pixel-level information of the bird's eye view; and determining recognition information of at least one obstacle according to the current frame embedded image and the pixel-level information.

The implementation principle and technical effect of the computer-readable storage medium according to the above embodiment are similar to those in the above method embodiment, which are not described in detail herein.

Those of ordinary skill in the art may understand that some or all procedures in the methods in the foregoing embodiments may be implemented by a computer program instructing related hardware, the computer program may be stored in a non-transitory computer-readable storage medium, and when the computer program is executed, the procedures in the foregoing method embodiments may be implemented. Any reference to a memory, a storage, a database, or other media used in the embodiments provided in the present application may include a non-transitory and/or a transitory memory. The non-transitory memory may include a read-only memory (ROM), a programmable ROM (PROM), an electrically programmable ROM (EPROM), an electrically erasable programmable ROM (EEPROM) or a flash memory. The transitory memory may include a random access memory (RAM) or an external high-speed cache memory. By way of illustration and not limitation, the RAM is available in a variety of forms, such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a memory Bus (Rambus) direct RAM (RDRAM), a direct memory bus dynamic RAM (DRDRAM), and a memory bus dynamic RAM (RDRAM).

The technical features in the foregoing embodiments may be freely combined. For concise description, not all possible combinations of the technical features in the embodiments are described. However, as long as combinations of the technical features do not conflict with each other, the combinations of the technical features are considered as falling within the scope described in this specification.

The foregoing embodiments only describe several implementations of the present application, and are described in detail, but they are not to be construed as a limitation to the patent scope of the disclosure. It should be noted that those of ordinary skill in the art may further make variations and improvements without departing from the ideas of the present application, and the variations and improvements shall fall within the protection scope of the present application. Therefore, the protection scope of the present application shall be subject to the protection scope of the appended claims.

What is claimed is:

1. An obstacle recognition method, wherein the method comprises:

acquiring point cloud data scanned by a Light Detection and Ranging (LiDAR) and time-sequence pose information of a vehicle;

determining a spliced image of bird's eye view according to the point cloud data, the time-sequence pose information, and a historical frame embedded image, comprising:

determining a grid embedded image of the bird's eye view according to the point cloud data;

determining a conversion image of the historical frame embedded image according to the time-sequence nose information and the historical frame embedded image, comprising:

calculating an affine transformation parameter from a historical frame to a current frame according to the time-sequence pose information; and transforming the historical frame embedded image by translation and rotation according to the affine transformation parameter to obtain the conversion image of the historical frame embedded image:

splicing the grid embedded image of the bird's eye view and the conversion image of the historical frame embedded image to obtain the spliced image of the bird's eye view;

inputting the spliced image into a preset first CNN model to obtain a current frame embedded image and pixel-level information of the bird's eye view; and determining recognition information of at least one obstacle according to the current frame embedded image and the pixel-level information, comprising:

determining attribute information of the at least one obstacle according to the pixel-level information, the attribute information comprising position information and size information of the obstacle;

determining pixel-level embedding of each obstacle from the current frame embedded image according to the attribute information of each obstacle; and inputting the pixel-level embedding of each obstacle into a preset neural network model to obtain recognition information of each obstacle, wherein the neural network model comprises a third CNN model and a second FC network model; and the inputting the pixel-level embedding of each obstacle into a preset neural network model to obtain recognition information of each obstacle comprises:

inputting the pixel-level embedding of each obstacle into the third CNN model to obtain object-level embedding of each obstacle; and inputting the object-level embedding into the second FC network model to obtain the recognition information of the at least one obstacle.

2. The method according to claim 1, wherein the step of determining a grid embedded image of the bird's eye view according to the point cloud data comprises:

acquiring panorama point embedding and each point feature according to the point cloud data;

inputting the panorama point embedding and each point feature into a preset first FC network model to obtain point embedding of each point; and projecting the point embedding of each point into a grid of the bird's eye view to obtain the grid embedded image of the bird's eye view.

3. The method according to claim 2, wherein the step of acquiring panorama point embedding and each point feature according to the point cloud data comprises:

extracting a panorama feature and each point feature from the point cloud data; and inputting the panorama feature into a preset second CNN model to obtain the panorama point embedding.

4. The method according to claim 1, wherein the recognition information comprises confidence level of the obstacle; and the method further comprises:

comparing the confidence level of the obstacle with a preset confidence threshold, and filtering out an obstacle whose confidence level is less than the preset confidence threshold.

5. A computer device, comprising a memory and a processor, the memory storing a computer program, wherein the processor implements the following steps when executing the computer program;

acquiring point cloud data scanned by Light Detection and Ranging (LiDAR) and time-sequence pose information of a vehicle;

determining a spliced image of a bird's eye view according to the point cloud data, the time-sequence pose information, and a historical frame embedded image, comprising:

determining a grid embedded image of the bird's eye view according to the point cloud data;

determining a conversion image of the historical frame embedded image according to the time-sequence pose information and the historical frame embedded image; and splicing the grid embedded image of the bird's eye view and the conversion image of the historical frame embedded image to obtain the spliced image of the bird's eye view;

inputting the spliced image into a preset first CNN model to obtain a current frame embedded image and pixel-level information of the bird's eye view; and determining recognition information of at least one obstacle according to the current frame embedded image and the pixel-level information, comprising:

determining attribute information of the at least one obstacle according to the pixel-level information, the attribute information comprising position information and size information of the obstacle;

determining pixel-level embedding of each obstacle from the current frame embedded image according to the attribute information of each obstacle; and inputting the pixel-level embedding of each obstacle into a preset neural network model to obtain recognition information of each obstacle wherein the neural network model comprises a third CNN model and a second FC network model;

and the inputting the pixel-level embedding of each obstacle into a preset neural network model comprises:

inputting the pixel-level embedding of each obstacle into the third CNN model to obtain object-level embedding of each obstacle; and inputting the object-level embedding into the second FC network model to obtain the recognition information of the at least one obstacle.

6. The computer device according to claim 5, wherein the step of determining a spliced image of bird's eye view according to the point cloud data, the time-sequence pose information, and a historical frame embedded image comprises:

determining a grid embedded image of the bird's eye view according to the point cloud data;

determining a conversion image of the historical frame embedded image according to the time-sequence pose information and the historical frame embedded image; and splicing the grid embedded image of the bird's eye view and the conversion image of the historical frame embedded image to obtain the spliced image of the bird's eye view.

7. The computer device according to claim 6, wherein the step of determining a grid embedded image of the bird's eye view according to the point cloud data comprises:

acquiring panorama point embedding and each point feature according to the point cloud data;

inputting the panorama point embedding and each point feature into a preset first FC network model to obtain point embedding of each point; and projecting the point embedding of each point into a grid of the bird's eye view to obtain the grid embedded image of the bird's eye view.

8. The computer device according to claim 7, wherein the step of acquiring panorama point embedding and each point feature according to the point cloud data comprises:

extracting a panorama feature and each point feature from the point cloud data; and inputting the panorama feature into a preset second CNN model to obtain the panorama point embedding.

9. The computer device according to claim 5, wherein the recognition information comprises confidence level of the obstacle; and the steps further comprises:

comparing the confidence level of the obstacle with a preset confidence threshold, and filtering out an obstacle whose confidence level is less than the preset confidence threshold.

10. A non-transitory computer-readable storage medium, storing a computer program, wherein the following steps are implemented when the computer program is executed by a processor:

acquiring point cloud data scanned by Light Detection and Ranging (LiDAR) and time-sequence pose information of a vehicle;

determining a spliced image of bird's eye view according to the point cloud data, the time-sequence pose information, and a historical frame embedded image, comprising:

determining a grid embedded image of the bird's eye view according to the point cloud data;

determining a conversion image of the historical frame embedded image according to the time-sequence nose information and the historical frame embedded image, comprising:

calculating an affine transformation parameter from a historical frame to a current frame according to the time-sequence pose information; and transforming the historical frame embedded image by translation and rotation according to the affine transformation parameter to obtain the conversion image of the historical frame embedded image;

splicing the grid embedded image of the bird's eye view and the conversion image of the historical frame embedded image to obtain the spliced image of the bird's eye view;

inputting the spliced image into a preset first CNN model to obtain a current frame embedded image and pixel-level information of the bird's eye view; and determining recognition information of at least one obstacle according to the current frame embedded image and the pixel-level information, comprising:

determining attribute information of the at least one obstacle according to the pixel-level information, the attribute information comprising position information and size information of the obstacle;

determining pixel-level embedding of each obstacle from the current frame embedded image according to the attribute information of each obstacle; and inputting the pixel-level embedding of each obstacle into a preset neural network model to obtain recognition information of each obstacle, wherein the neural network model comprises a third CNN model and a second FC network model; and the inputting the pixel-level embedding of each obstacle into a preset neural network model to obtain recognition information of each obstacle comprises:

inputting the pixel-level embedding of each obstacle into the third CNN model to obtain object-level embedding of each obstacle; and inputting the object-level embedding into the second FC network model to obtain the recognition information of the at least one obstacle.

* * * * *